(12) United States Patent
Kurihara et al.

(10) Patent No.: US 9,580,241 B2
(45) Date of Patent: Feb. 28, 2017

(54) FOUL-ODOR-SEALING BAG

(71) Applicant: Kazuyuki Kurihara, Osaka-shi (JP)

(72) Inventors: Kazuyuki Kurihara, Osaka (JP); Ayano Yasuhara, Osaka (JP)

(73) Assignee: Kazuyuki Kurihara, Osaka (JP)

( * ) Notice: Subject to any disclaimer, the term of this patent is extended or adjusted under 35 U.S.C. 154(b) by 0 days.

(21) Appl. No.: 14/890,762

(22) PCT Filed: May 15, 2014

(86) PCT No.: PCT/JP2014/062920
§ 371 (c)(1),
(2) Date: Nov. 12, 2015

(87) PCT Pub. No.: WO2014/185482
PCT Pub. Date: Nov. 20, 2014

(65) Prior Publication Data
US 2016/0114974 A1    Apr. 28, 2016

(30) Foreign Application Priority Data
May 15, 2013    (JP) .................................. 2013-103181

(51) Int. Cl.
| B65F 1/00 | (2006.01) |
| B32B 27/32 | (2006.01) |
| B32B 7/12 | (2006.01) |
| B32B 27/08 | (2006.01) |
| B32B 27/20 | (2006.01) |
| B32B 27/30 | (2006.01) |
| B32B 27/34 | (2006.01) |
| B32B 27/36 | (2006.01) |

(52) U.S. Cl.
CPC .............. *B65F 1/0026* (2013.01); *B32B 7/12* (2013.01); *B32B 27/08* (2013.01); *B32B 27/20* (2013.01); *B32B 27/306* (2013.01); *B32B 27/32* (2013.01); *B32B 27/34* (2013.01); *B32B 27/36* (2013.01); *B32B 2264/101* (2013.01); *B32B 2264/102* (2013.01); *B32B 2264/104* (2013.01); *B32B 2264/107* (2013.01); *B32B 2307/746* (2013.01); *B32B 2439/46* (2013.01); *B32B 2555/02* (2013.01); *B65F 2240/132* (2013.01); *B65F 2240/136* (2013.01); *B65F 2250/1143* (2013.01)

(58) Field of Classification Search
CPC B32B 27/32; B32B 7/12; B32B 27/08; B32B 27/20; B32B 27/306; B32B 27/34; B32B 27/36; B32B 2264/101; B32B 2264/102; B32B 2264/104; B32B 2264/107; B32B 2307/746; B32B 2439/46; B32B 2555/02; B65F 1/0026; B65F 2240/132; B65F 2240/136; B65F 2250/1143
See application file for complete search history.

(56) References Cited

U.S. PATENT DOCUMENTS

| 6,114,024 A | 9/2000 | Forte |
| 6,777,067 B1 | 8/2004 | Speith-Herfurth et al. |
| 2008/0107899 A1 | 5/2008 | Lu |

FOREIGN PATENT DOCUMENTS

| CN | 1289351 A | 3/2001 |
| CN | 200942057 Y | 9/2007 |
| CN | 101528462 A | 9/2009 |
| CN | 102501529 A | 6/2012 |
| JP | 2001-031134 | 2/2001 |
| JP | 2002-347188 | 12/2002 |
| JP | 2004-268940 | 9/2004 |
| JP | 2005-067857 | 3/2005 |
| JP | 2006-281651 | 10/2006 |
| JP | 2008162162 A | 7/2008 |
| WO | 9704955 A1 | 2/1997 |

OTHER PUBLICATIONS

English machine translation of JP 2006281651.*
English machine translation JP 2004268940.*

* cited by examiner

*Primary Examiner* — Michael C Miggins
(74) *Attorney, Agent, or Firm* — The Webb Law Firm

(57) ABSTRACT

A four-odor-sealing bag comprising an inner layer and an outer layer each of which comprises polyethylene or an ethylene-based copolymer, and an intermediate layer comprising a barrier resin, wherein the inner and the outer layers each contain an antiblocking agent and a surface active agent, the amount of the antiblocking agent contained in each of the inner layer and the outer layer is not less than 6500 ppm, the amount of the surface active agent contained in each of them is in the range of 1000 to 8000 ppm, the thickness of the intermediate layer is in the range of 0.8 to 5.0 μm, the total thickness of all of the layers is in the range of 10 to 30 μm, the four-odor-sealing bag is a co-extrusion inflation product and has the bottom of the four-odor-sealing bag is sealed by fusion bonding, and in the use of the four-odor-sealing bag, a non-fusion bonded opening is tied closed to seal in the contents.

12 Claims, No Drawings

FOUL-ODOR-SEALING BAG

CROSS-REFERENCE TO RELATED APPLICATIONS

This application is the United States national phase of International Application No. PCT/JP2014/062920 filed May 15, 2014, and claims priority to Japanese Patent Application No. 2013-103181 filed May 15, 2013, the disclosures of which are hereby incorporated in their entirety by reference.

TECHNICAL FIELD

The present invention relates to a foul-odor-sealing bag which comprises at least a layer comprising a barrier layer and a polyethylene layer and is used by placing a used disposable diaper, pet waste, kitchen garbage or other foul-smelling substances therein and tying its opening.

BACKGROUND ART

In the case of changing disposable diapers or paper underpants of babies, infants or bedridden elderly people, the disposable diapers, etc. soiled with filth have been wrapped in paper or the like and disposed of in the past.

However, only by placing or wrapping the soiled material to be disposed of, such as disposable diaper, in a plastic bag or paper, an offensive odor is in the surrounding air to deteriorate the ambient environment.

Moreover, making a loud sound in the change of a diaper in the nighttime sometimes disturbs sleep of a person who is asleep in the same house or the same room. In particular, many of odor prevention bags or deodorizing bags that are on the market produce loud friction sounds when their openings are closed. Further, when their openings are tied, it is difficult to tie them sealed, and if the bags are stiff or have poor sliding properties, there are problems such that they are difficult to tie, and an odor leaks out from the knot because the knot is not sealed.

As a waste bag functioning as a used excrement-disposal tool, Japanese Patent Laid-Open Publication No. 2005-67857 (patent literature 1) is known. In the patent literature 1, a waste bag using a laminate film consisting of an outer layer of low-density polyethylene and an inner layer of high-density polyethylene has been proposed.

Also the present applicant has proposed, as a fecal odor blocking film, a film comprising an amorphous amide layer (A) containing an amorphous polyamide in an amount of not less than 70% by weight, and a polyolefin layer (B) and/or an adhesive resin layer (C), and having, if necessary, an aromatic polyamide layer (D), in Japanese Patent Laid-Open Publication No. 2006-281651 (patent literature 2).

Here, polyethylene films are inferior in blocking properties against a fecal odor, and therefore, excrement disposal or waste bags using polyethylene films emit a fecal odor and give unpleasant feeling to the users or the people around, so that excrement disposal or waste disposal films (fecal odor blocking films) having more excellent fecal odor blocking performance have been desired. It has been thought in the past that in order to impart odor blocking properties to plastic films, multilayer films containing an ethylene/vinyl alcohol copolymer, polyvinylidene chloride or the like that is considered to be a resin of excellent odor blocking performance are preferable. Of such resins, polyvinyldene chloride can be mentioned as a resin having excellent odor blocking performance. However, used bags in which excrement has been disposed of are frequently subjected to incineration, and when multilayer films comprising a vinylidene chloride-based resin are incinerated, there is a possibility of generation of dioxin, so that such films are undesirable from the viewpoint of environmental influence. On the other hand, the ethylene/vinyl alcohol copolymer is a non-chlorine-based resin and is preferable from the viewpoint of environmental influence. However, the odor blocking properties of the resin greatly vary depending upon the target odor, and multilayer films comprising the ethylene/vinyl alcohol copolymer are markedly inferior in the fecal odor blocking performance to multilayer films comprising a vinylidene chloride-based resin.

Noting various properties of amorphous nylon, multilayer films containing amorphous nylon have been developed. However, these multilayer films use amorphous nylon for the main purpose of improvement in molding properties, improvement in labeling properties, prevention of curling, or the like, and sufficient level of odor blocking performance, particularly fecal odor blocking performance, has not been attained. In Japanese Patent Laid-Open Publication No. 2002-347188 (patent literature 3), an ostomy bag (stoma appliance) obtained by laminating a polyethylene-based copolymer and a mixture of the copolymer and an amorphous polyamide resin so as to form a laminate of A (polyethylene)/B (the mixture)/A has been disclosed. This patent literature 3 is a bag having been fitted to a stoma in advance, and is entirely different in problems from a foul-odor-sealing bag that is used by being tied similarly to the present invention.

CITATION LIST

Patent Literature

Patent literature 1: Japanese Patent Laid-Open Publication No. 2005-067857
Patent literature 2: Japanese Patent Laid-Open Publication No. 2006-281651
Patent literature 3: Japanese Patent Laid-Open Publication No. 2002-347188

The present invention is intended to solve such problems associated with the prior art as described above, and it is an object of the present invention to provide a sealing bag which has blocking performance against a foul odor of a foul-smelling substance, particularly fecal odor blocking performance to block an odor emitted from fecal matter (fecal odor), and produces a small rustling sound, and an opening of which can be tied easily and fast.

SUMMARY OF THE INVENTION

Constitution of the present invention is as follows.

[1] A four-odor-sealing bag comprising
an inner layer and an outer layer each of which comprises polyethylene or an ethylene-based copolymer (referred to as an "ethylene (co)polymer" hereinafter), and
an intermediate layer comprising a barrier resin, wherein
the inner and the outer layers each contain an antiblocking agent and a surface active agent,
the amount of the antiblocking agent contained in each of the inner layer and the outer layer is not less than 6500 ppm, the amount of the surface active agent contained in each of them is in the range of 1000 to 8000 ppm,
the thickness of the intermediate layer is in the range of 0.8 to 5.0 µm, the total thickness of all of the layers is in the range of 10 to 30 μm, the four-odor-sealing bag is a co-extrusion inflation product and has the bottom sealed by fusion bonding, and in the use of the four-odor-sealing bag, a non-fusion bonded opening is tied closed to seal in the contents.

[2] The four-odor-sealing bag of [1], wherein the ethylene (co)polymer is linear low-density polyethylene (LLDPE).

[3] The four-odor-sealing bag of [1] or [2], wherein the barrier resin comprises at least one kind selected from a polyamide, an ethylene/vinyl alcohol copolymer (EVOH) and polybutylene terephthalate.

[4] The four-odor-sealing bag of [3], wherein the barrier resin is a polyamide containing an amorphous polyamide in an amount of not less than 70% by weight.

[5] The four-odor-sealing bag of [1], wherein the antiblocking agent is at least one kind selected from zeolite, talc, kaolin, silica, calcium carbonate and glass powder.

[6] The four-odor-sealing bag of [4], wherein an aliphatic polyamide or a polyolefin is contained in the intermediate layer.

[7] The four-odor-sealing bag of [1], wherein the intermediate layer is joined to the inner layer and/or the outer layer through an adhesive resin layer.

[8] The four-odor-sealing bag of [1], wherein the surface active agent is at least one kind selected from alkylsulfonate, alkylbenzenesulfonate, alkyl phosphate, tetraalkylammonium salt, trialkylbenzylammonium salt, glycerol fatty acid ester, polyoxyalkylene alkyl ether, polyoxyethylene alkylphenyl ether, N,N-bis(2-hydroxyethyl)alkylamine [alias: alkyldiethanolamine], N-2-hydroxyethyl-N-2-hydroxyalkylamine [alias: hydroxyalkylmonoethanolamine], polyoxyethylene alkylamine, polyoxyethylene alkylamine fatty acid ester, alkyl diethanolamide, alkyl betaine and alkyl imidazolium betaine.

[9] A disposal method for a household foul-smelling substance, comprising placing a foul-smelling substance in a four-odor-sealing bag which comprises an inner layer and an outer layer each of which comprises polyethylene or an ethylene-based copolymer (referred to as an "ethylene (co)polymer" hereinafter), and an intermediate layer comprising a barrier resin, wherein the inner and the outer layers each contain an antiblocking agent and a surface active agent, the amount of the antiblocking agent contained in each of the inner layer and the outer layer is not less than 6500 ppm, the amount of the surface active agent contained in each of them is in the range of 1000 to 8000 ppm, the thickness of the intermediate layer is in the range of 0.8 to 5.0 μm, the total thickness of all of the layers is in the range of 10 to 30 μm, the four-odor-sealing bag is a co-extrusion inflation product and has the bottom sealed by fusion bonding; and tying a non-fusion bonded opening of the sealing bag closed to seal in the contents.

ADVANTAGEOUS EFFECTS OF INVENTION

When used disposable diapers, pet waste, kitchen garbage, other foul-smelling substances, etc. are placed in the four-odor-sealing bag of the present invention, the opening of the bag can be easily tied, and sealing properties of the knot are high. On this account, odors of foul-smelling substances once placed in the bag do not leak out, and therefore, unpleasant feeling of the people around can be reduced. Moreover, the sound made when the opening is tied is small, and therefore, even in the nighttime or circumstances where many people are present, the foul-smelling substances can be sealed in without being noticed by other people.

DESCRIPTION OF EMBODIMENTS

The present invention is concretely described below, but the present invention should not be construed limitedly thereto and can be appropriately applied according to the purpose.

The four-odor-sealing bag of the present invention is formed of a specific multilayer film and is used by tying its non-fusion bonded opening to seal in the contents.

As the foul-smelling substances applicable to the present invention, not only fecal matter but also rotten materials, food that emit offensive odors (durian, Kusaya and the like), etc. can be mentioned.

Constitution of Sealing Bag

The sealing bag of the present invention comprises an inner layer and an outer layer each of which comprises polyethylene or an ethylene-based copolymer (referred to as an "ethylene (co)polymer" hereinafter), and an intermediate layer comprising a barrier resin.

Inner and Outer Layers:

The outer layer and the inner layer each comprise polyethylene or an ethylene-based copolymer.

Examples of polyethylenes include low-density polyethylene (LDPE), linear low-density polyethylene (LLDPE), medium-density polyethylene (MDPE) and high-density polyethylene (HDPE).

Examples of the ethylene-based copolymers include a copolymer of ethylene and another α-olefin, a copolymer of ethylene and vinyl acetate (EVA), and a copolymer of ethylene and methacrylic acid (EMMA).

In the present invention, polyethylene is preferably used. Polyethylene is softer than other polyolefins, is easily processed and is excellent in heat-sealing properties, strength, feel and flexibility. In particular, linear low-density polyethylene prepared by polymerization using a metallocene catalyst and having a density of 0.89 to 0.93 g/cm$^3$ is preferably used.

In the present invention, the inner and the outer layers each comprise LLDPE. By adopting such a combination, strength of the bag can be enhanced.

In addition, an antiblocking agent and a surface active agent are contained in each of the inner and the outer layers.

In each of the inner layer and the outer layer, the antiblocking agent is contained in an amount of not less than 6500 ppm. The amount of the antiblocking agent contained in each of the inner layer and the outer layer is preferably not less than 10000 ppm. The type and the amount of the antiblocking agent contained in the inner layer may be the same as or different from those contained in the outer layer, and if the amount of the antiblocking agent in the inner layer is in a given range, the amount thereof in the outer layer may be out of the above range. It is preferable that the amount of the antiblocking agent in each layer is in the above range.

If the amount of the antiblocking agent used in the inner layer is small, the bag sometimes has poor easy opening properties. If the amount of the antiblocking agent is increased, easy opening properties of the bag are improved, but sealing properties of the tied portion are sometimes deteriorated. However, even if the amount of the antiblocking agent is large, the sealing properties are improved because an antistatic agent is added, and as a result, the amount of the antiblocking agent can be increased. Therefore, sealing properties and easy opening properties are made compatible.

Examples of the antiblocking agents include inorganic antiblocking agents, such as zeolite, talc, kaolin, silica, calcium carbonate, glass powder, alumina (aluminum hydroxide), hydrotalcite and talc, and organic antiblocking agents, such as glycerol fatty acid ester monoglyceride, glycerol fatty acid ester acetylated monoglyceride, glycerol fatty acid ester organic acid monoglyceride, glycerol fatty acid medium-chain triglyceride, polyglycerol fatty acid ester, sorbitan fatty acid ester, propylene glycol fatty acid ester, special fatty acid ester, higher alcohol fatty acid ester, ethylene oxide adduct polyoxyethylene alkyl ether, ethylene oxide adduct polyoxyethylene sorbtan fatty acid ester and ethylene oxide adduct polyoxyethylene glycerol fatty acid ester.

Of these, at least one kind selected from zeolite, talc, kaolin, silica, calcium carbonate and glass powder is preferably used in the present invention.

By adding such an antiblocking agent, a friction sound made by rubbing can be reduced while excellent feel and flexibility are maintained. Moreover, by combining the layer constitution of the present invention, the opening of the bag can be easily wrung and tied, and besides, it can be tied closed.

If the antiblocking agent is contained in excess, strength and extensibility are liable to be lowered.

In the present invention, a surface active agent is contained in the inner and the outer layers. The surface active agent functions as an antistatic agent, and when such a surface active agent is contained, a bag that hardly loosens after it is tied can be obtained, and sealing properties of the bag can be further enhanced. In the present specification, the surface active agent is sometimes also referred to as an "antistatic agent" simply hereinafter.

The amount of the surface active agent used in each layer is in the range of 1000 to 8000 ppm. If the amount of the surface active agent is small, the knot of bag is loose because of many gaps and is liable to come untied. If the amount of the surface active agent is too large, the surface active agent bleeds out to make the bag itself powdery.

As the surface active agent, a cationic, anionic, zwitterionic or nonionic surface active agent can be used. Specific examples of such surface active agents include alkylsulfonate, alkylbenzenesulfonate, alkyl phosphate, tetraalkylammonium salt, trialkylbenzylammonium salt, glycerol fatty acid ester, polyoxyalkylene alkyl ether, polyoxyethylene alkylphenyl ether, N,N-bis(2-hydroxyethyl)alkylamine [alkyldiethanolamine], N-2-hydroxyethyl-N-2-hydroxyalkylamine[hydroxyalkylmonoethanolamine], polyoxyethylene alkylamine, polyoxyethylene alkylamine fatty acid ester, alkyl diethanolamide, alkyl betaine and alkyl imidazolium betaine.

In the working examples of the present specification, a mixture of monoglyceride and an amine-based surface active agent is used.

In the inner and the outer layers, a disinfectant and a deodorant may be further contained. Specific examples thereof include menthol, cresol and methyl salicylate. Furthermore, various perfumes may be contained.

Moreover, colorants, such as pigment and dye, fillers, such as calcium carbonate and magnesium hydroxide, etc. may be contained, when needed.

Intermediate Layer:

The intermediate layer comprises a barrier resin. As the barrier resins, resins having gas barrier properties can be adopted without any restriction.

As the barrier resins, publicly known ones can be used. Specific examples thereof include nylons (NY), polyvinyl alcohol (PVA), ethylene/vinyl alcohol copolymer resin (EVOH), polyvinylidene chloride (PVDC) and polybutylene terephthalate (PBT).

As NY, nylon 6 (available from Ube Industries, Ltd., etc.), so-called MXD nylon composed of metaxylenediamine/adipic acid (available from Mitsubishi Gas Chemical Company Ltd.), etc. can be mentioned.

As PVA, one available from The Nippon Synthetic Chemical Industry Co., Ltd. can be used. As EVOH, one available from The Nippon Synthetic Chemical Industry Co., Ltd. or available from Kuraray Co., Ltd. can be used. As PVDC, one available from Unitika Ltd., etc. can be mentioned.

As PBT, one available from Mitsubishi Engineering-Plastics Corporation, etc. can be used.

These barrier resins may be made composite with one another (e.g., may be laminated).

Of these barrier resins, at least one kind selected from a polyamide, an ethylene/vinyl alcohol copolymer (EVOH) and polybutylene terephthalate is preferable in the present invention, and an amorphous polyamide is more preferable.

From the viewpoint of foul odor blocking performance, it is desirable that the amorphous polyamide layer contains an amorphous polyamide in an amount of not less than 70% by weight, preferably not less than 80% by weight, more preferably not less than 90% by weight, and in an amount of not more than 100% by weight, and the amorphous polyamide layer is particularly preferably formed of an amorphous polyamide only.

In order to impart flexibility while maintaining foul odor blocking performance, the intermediate layer may contain an aliphatic polyamide or a polyolefin, and in this case, an aliphatic polyamide or a polyolefin may be contained in an amount of less than 30% by weight, preferably less than 20% by weight, more preferably less than 10% by weight. When an aliphatic polyamide or a polyolefin is contained in this amount, blocking performance against a fecal odor and the like is not lowered, and besides, stiffness can be improved. As the polyolefins, products of Asahi Kasei Corporation, Ube Industries, Ltd., Sumitomo Chemical Co., Ltd., Mitsui Chemicals, Inc., etc. can be used.

The amorphous polyamide is not specifically restricted provided that it is a polyamide that does not substantially exhibit crystalline properties, and specifically, there can be mentioned a semi-aromatic polyamide obtained by polycondensation of an aromatic dicarboxylic acid and an aliphatic or alicyclic diamine; a polyamide obtained by copolymerization of an aromatic dicarboxylic acid, an aliphatic or alicyclic dicarboxylic acid, and an aliphatic or alicyclic diamine; and a polyamide obtained by copolymerization of an aromatic dicarboxylic acid, an aliphatic or alicyclic diamine, and a cyclic amide monomer.

Examples of the aromatic dicarboxylic acids include terephthalic acid and isophthalic acid. Examples of the aliphatic diamines include 1,6-hexamethylenediamine and trimethyl-1,6-hexamethylenediamine. Examples of the alicyclic diamines include 4,4'-diamino-dicyclohexylenemethane, 4,4'-diamino-3,3'-dimethyl-dicyclohexylenemethane, 4,4'-diamino-dicyclohexylenepropane and isophoronediamine. Examples of the aliphatic dicarboxylic acids include adipic acid, sebacic acid, azelaic acid and dodecanedicarboxylic acid. Examples of the alicyclic dicarboxylic acids include 1,4-cyclohexanedicarboxylic acid. Examples of the cyclic amide monomers include ε-caprolactam and ω-laurolactam.

Of the above amorphous polyamides, an amorphous polyamide having a glass transition temperature of not lower than 100° C. is preferable, and in particular, nylon 6T/6I obtained by polycondensation of 1,6-hexamethylenediamine, terephthalic acid and isophthalic acid is preferable.

Examples of the aliphatic polyamides include a ring-opened polymer of a cyclic amide monomer, and a polycondensate of an aliphatic dicarboxylic acid and an aliphatic diamine. As the cyclic amide monomer, the aliphatic dicarboxylic acid and the aliphatic diamine, the same ones as previously described can be used. Specific examples of the aliphatic polyamides include nylon 6, nylon 66, nylon 12, nylon 6.12, and copolymers of these nylons. Of these, nylon 6 and a copolymer of nylon 6 and nylon 66 are preferable.

In the present invention, an intermediate layer substantially formed of an amorphous polyimide only is a desired embodiment, but the intermediate layer may be a layer containing a small amount of a polyamide other than the amorphous polyamide, such as nylon 6 (6NY), provided that the amount thereof is in a range capable of maintaining high fecal odor blocking performance. In this case, the layer may contain nylon 6 or the like in an amount of less than 20% by weight, preferably less than 15% by weight, more preferably less than 10% by weight.

When such an amorphous polyamide layer is used as the intermediate layer, a waste bag that is excellent in fecal odor blocking performance can be obtained.

In the intermediate layer, an additive may be contained in addition to the barrier resin.

Between the intermediate layer and the outer layer and/or the inner layer, an adhesive layer may be formed.

The resin for the adhesive layer is not specifically restricted provided that it is a resin capable of adhesion bonding the intermediate layer to the outer layer and/or the inner layer, but preferable is a polyolefin resin modified with an acid such as maleic anhydride. Of the acid-modified polyolefin resins, maleic anhydride-modified polyethylene is preferable, and in particular, maleic anhydride-modified linear low-density polyethylene is preferably used from the viewpoint of excellent adhesion properties.

In order to further enhance strength, an aliphatic polyamide layer may be formed. As the aliphatic polyamides used herein, the same aliphatic polyamides as the aforesaid ones can be mentioned. Of these, nylon 6 or a copolymer of nylon 6 and nylon 66 is preferably used. When the layers are laminated through an adhesive resin layer, delamination due to deformation of the film hardly takes place.

To each of the above layers, a publicly known deodorant can be added, when needed. By virtue of this, odor blocking effect can be further enhanced.

In the present invention, the thickness of the intermediate layer is in the range of 0.8 to 5.0 μm, preferably 1 to 3 μm. When the intermediate layer is particularly an amorphous polyamide layer, this layer has not only excellent fecal odor blocking performance but also excellent flexibility even if the layer has such a small thickness as above.

The total thickness of all of the layers of the four-odor-sealing bag is in the range of 10 to 30 μm. If the total thickness of all of the layers is less than the lower limit, strength of the bag is sometimes lowered, and if the total thickness thereof exceeds the upper limit, flexibility of the bag is sometimes lowered. The bag having a total thickness of the above range can be sealed by tying its opening portion.

Although the shape of the bag is not specifically restricted, it is properly selected according to the size of the contents, and a gore portion may be provided, or a turn-up portion may be provided.

Since such a sealing bag has high strength and extensibility, there is no leakage of the contents caused by rupture of the bag due to the contents. Moreover, the knot hardly loosens, and the contents do not leak out from the knot. On the other hand, the bag can be easily torn in the transverse direction, that is, it has ease of opening in the transverse direction. In particular, the bag has transverse linear cutting properties. On this account, the bag can be briefly torn by hand in the transverse direction, and therefore, opening of the contents can be easily made.

For example, fecal matter or kitchen garbage contained in the four-odor-sealing bag can be thrown away into a flush toilet or a disposer by tearing the bag without untying the knot. The four-odor-sealing bag of the present invention can be cut straightly, produces no whisker when it is torn, and can be easily torn up with a nail.

Production Process for Four-Odor-Sealing Bag

The four-odor-sealing bag of the present invention has the intermediate layer, the outer layer and the inner layer, and has an adhesive resin layer when needed. The four-odor-sealing bag may be produced by laminating these layers one upon another, or may be produced by co-extruding materials for forming the layers. Of these, a co-extrusion inflation is preferable, and in particular, a bag obtained by using a water-cooling type co-extrusion inflation apparatus is preferable. A four-odor-sealing bag produced by a water-cooling type co-extrusion inflation method exhibits more excellent flexibility, and therefore, it can be preferably used as a four-odor-sealing bag.

A film produced as above is formed into a bag. In this operation, a bottom portion of a tubular film may be sealed by fusion bonding to form a bag, or two films may be superposed upon each other and sealed on the three sides by fusion bonding to form a bag, but the former is preferably used.

The four-odor-sealing bag of the present invention is used by tying its opening after a foul-smelling substance or the like is placed in the bag. When the opening is tied, the sound produced is small, the opening is easily tied, and sealing properties of the knot are high. On this account, an odor of a foul-smelling substance once placed in the bag does not leak out, and therefore, unpleasant feeling of the people around can be reduced.

The disposal method for a foul-smelling substance according to the present invention comprises placing a foul-smelling substance in the above-mentioned sealing bag and tying a non-fusion bonded opening of the sealing bag closed to seal in the contents. According to the present invention, the knot hardly loosens, the sound produced when the bag is tied or when a foul-smelling substance is placed in the bag is small, and an odor of a foul-smelling substance once placed in the bag does not leak out, so that unpleasant feeling of the people around can be reduced. Moreover, the sound made when the opening is tied is small, and therefore, even in the nighttime or circumstances where many people are present, a foul-smelling substance can be sealed in without being noticed by other people.

EXAMPLES

The present invention will be further described below with reference to the following examples, but it should be construed that the present invention is in no way limited to those examples.

Evaluation method for foul odor blocking properties of four-odor-sealing bags obtained in the examples and the comparative examples, knot evaluation method and loudness of sound generated are shown below.

<Fecal Odor Blocking Properties>

Organoleptic Test

Method: A diaper with fecal matter is placed in the bag and allowed to stand. At each elapsed time, the bag was sniffed at, and leakage of odor from the bag was ranked according to the three-grade evaluation (evaluation: the bag does not smell: ◯; the bag slightly smells: Δ; the bag smells: x).

Evaluation criteria: The elapsed time, at which evaluation of "the bag smells: x" had been made, was scored, and an average of the scores of 13 people was taken.

(Evaluation: 30 minutes: −3 point, 1 day: −1 point, 5 days: +1 point, 6 days or more: +3 points)

<Ease of Tying (Flexibility)>

Young's Modulus

Method: Young's modulus of the film was measured (measuring method: JIS K7126).

Evaluation of Leakage

Method: After the bag was filled with a penetrant (Ageless check), an opening of the bag was tied, and the bag was hung in such a manner that the knot was set down. At each elapsed time, presence or absence of liquid leakage from the knot was confirmed.

Evaluation criteria: The bag was evaluated on the base of the elapsed time at which liquid leakage was confirmed.

Organoleptic Test

The bag was tied, and ease of tying was evaluated. Using the film of Example 1 as a reference, ease of tying of the bag was ranked according to the three-grade evaluation and scored, and an average of the scores of 10 people was taken. (Evaluation: the bag is more easily tied as compared with Example 1: 3 points; the bag is tied equally easily to Example 1: 2 points; the bag is difficult to tie: 1 point)

<Strength>

Gelbo Flex Test

Method: The film was bent, and the number of pinholes formed was confirmed. (Measuring method: MIL-B-131C, measuring conditions: 23° C., 2000 times or 500 times)

<Sound>

Sound Level Measurement

Method: The bag was held in one hand and crumpled up at a rate of 2 times/sec, and the sound level was measured for 5 seconds by a sound level meter to determine a maximum value. This measurement was carried out three times, and an average was taken. (Measuring device: RION precision sound level meter, N evaluation criteria)

A difference between 50 dB and the maximum value was determined, and the resulting value was divided by 20 to carry out quantification. The resulting numerical value was scored according to the following five-grade evaluation. (Ratio: not more than 2: 5 points, 2 to 3: 4 points, 3 to 4: 3 points, 4 to 5: 2 points, not less than 5: 1 point)

Here, 50 dB is a sound level of a quiet office, and the sound level of a noisy office or a noisy street is about 1 point.

Example 1

Using a five-kind five-layer co-extrusion water-cooling inflation apparatus, a four-odor-sealing bag consisting of a first layer of linear low-density polyethylene (LLDPE, density: 0.915 g/cm$^3$) prepared by polymerization using a metallocene catalyst, a second layer of an adhesive resin (maleic acid-modified PE), a third layer of an amorphous polyamide, a fourth layer of an adhesive resin (maleic acid-modified PE) and a fifth layer of polyethylene (PE, density: 0.924 g/cm$^3$) and having a total film thickness of 20 μm was obtained. The layers are referred to, from the outermost layer, as a first layer, a second layer, a third layer, a fourth layer and a fifth layer in this order. The third layer corresponded to an intermediate layer, and the thickness of the intermediate layer was 1 μm. As the antiblocking agent, zeolite was contained in an amount of 28000 ppm in the first layer and contained in an amount of 18000 ppm in the fifth layer, said first and fifth layers being polyethylene layers forming the inner and the outer layers.

In Example 1, the antistatic agent was contained in an amount of 4000 ppm in each of the first layer and the fifth layer.

The bag prepared had a size of 38×22 cm.

In Table 1, layer constitution of this four-odor-sealing bag, and evaluation results of foul-smelling substance blocking performance, flexibility, strength and sound are set forth together.

Example 2

A four-odor-sealing bag was prepared in the same manner as in Example 1, except that the amount of the antiblocking agent was changed to 4000 ppm in the first layer and changed to 11500 ppm in the fifth layer. Then, the four-odor-sealing bag was evaluated.

Layer constitution of this four-odor-sealing bag, and evaluation results of foul-smelling substance blocking performance, ease of tying, strength and sound are set forth in Table 1.

Example 3

A four-odor-sealing bag was prepared in the same manner as in Example 2, except that the thickness of the third layer was changed to 4 μm. Then, the four-odor-sealing bag was evaluated.

Comparative Example 1

A four-odor-sealing bag was prepared in the same manner as in Example 2, except that low-density polyethylene (LDPE) was used instead of LLDPE in the first layer and the fifth layer. Then, the foul-smelling substance sealing was evaluated.

Comparative Example 2

A four-odor-sealing bag was prepared in the same manner as in Example 2, except that the thickness of the intermediate layer was changed to 0.5 μm. Then, the four-odor-sealing bag was evaluated.

Comparative Example 3

A four-odor-sealing bag was prepared in the same manner as in Example 2, except that the thickness of the intermediate layer was changed to 3 μm and the total thickness of all of the layers was changed to 60 μm. Then, the four-odor-sealing bag was evaluated.

Comparative Example 4

A four-odor-sealing bag was prepared in the same manner as in Example 1, except that polyethylene was used in the first layer, an ethylene/vinyl alcohol copolymer (EVOH, ethylene content: 44% by mol) was used instead of the amorphous polyamide in the third layer, the antiblocking agent was not added, the thickness of the third layer was changed to 5 μm, and the total thickness of all of the layers was changed to 50 μm. Then, the four-odor-sealing bag was evaluated.

Comparative Example 5

A four-odor-sealing bag was prepared in the same manner as in Example 1, except that polybutylene terephthalate was used in the first layer, polyethylene was used in the third layer to the fifth layer, the antiblocking agent was not added, the thickness of the third layer was changed to 3.2 μm, and the total thickness of all of the layers was changed to 40 μm. Then, the four-odor-sealing bag was evaluated.

Comparative Example 6

Using a single layer inflation apparatus, a four-odor-sealing bag formed of the above PBT and having a thickness of 25 μm was prepared, and the four-odor-sealing bag was evaluated.

Comparative Examples 7 to 9

Using a single layer inflation apparatus, four-odor-sealing bags formed of the above PE and having a thickness of 20 μm were prepared, and the four-odor-sealing bags were evaluated. In the PE of Comparative Examples 7 and 8, a deodorant was contained in an amount of about several %. In Comparative Example 9, a deodorant was not contained.

Reference Example

In Example 1, a polyamide composition containing 20% by weight of 6-NY, said composition having been prepared by mixing 80 parts by weight of an amorphous polyamide with 20 parts by weight of 6-NY, was used instead of the amorphous polyamide of the third layer, the thickness of the third layer was changed to 2 μm, and the total thickness was set to 20 μm, whereby a four-odor-sealing bag was prepared. Then, the four-odor-sealing bag was evaluated. In Reference Example, the antistatic agent was contained in an amount of 4000 ppm in each of the first layer and the fifth layer. Since this Reference Example contained 6-Ny in a large amount, it had slightly lower fecal odor blocking properties, so that it was treated as a reference example.

The results are set forth all together in Table 1.

TABLE 1

| | Layer constitution | | | | | Thickness (μm) | | Formulation of additive (ppm) | | |
| --- | --- | --- | --- | --- | --- | --- | --- | --- | --- | --- |
| | First | Second | Third | Fourth | Fifth | Intermediate layer | All of the layers | Outer layer | Inner layer | Antistatic agent |
| Ex. 1 | LL | AD | AMNY | AD | PE | 1 | 20 | 28000 | 18000 | yes |
| Ex. 2 | LL | AD | AMNY | AD | PE | 1 | 20 | 4000 | 11500 | no |
| Ex. 3 | LL | AD | AMNY | AD | PE | 4 | 20 | 4000 | 11500 | no |
| Comp. Ex. 1 | LD | AD | AMNY | AD | PE | 1 | 20 | 4000 | 11500 | no |
| Comp. Ex. 2 | LL | AD | AMNY | AD | PE | 0.5 | 20 | 4000 | 11500 | no |
| Comp. Ex. 3 | LL | AD | AMNY | AD | PE | 3 | 60 | 4000 | 11500 | no |
| Comp. Ex. 4 | PE | AD | EVOH | AD | PE | 5 | 50 | 0 | 0 | no |
| Comp. Ex. 5 | PBT | AD | PE | PE | PE | 3.2 | 40 | 0 | 0 | no |
| Comp. Ex. 6 | | | PBT | | | 25 | 25 | | | no |
| Comp. Ex. 7 | | | PE | | | 0 | 20 | | | no |
| Comp. Ex. 8 | | | PE | | | 0 | 20 | | | no |
| Comp. Ex. 9 | | | PE | | | 0 | 20 | | | no |
| Ref. Ex. | LL | AD | AMNY + 6NY | AD | PE | 2 | 20 | 28000 | 18000 | yes |

| | Fecal odor blocking properties Organoleptic test | Ease of tying | | | | |
| --- | --- | --- | --- | --- | --- | --- |
| | | Young's modulus (MPa) | Leakage from knot (time) | Organoleptic test | Strength Gelbo | Sound Sound level |
| Ex. 1 | 3 | 250 | 34.0 | reference | 1 | 5 |
| Ex. 2 | 3 | 230 | 4.5 | 2 | 1 | 5 |
| Ex. 3 | 2.4 | 480 | 3.3 | 1 | | 5 |
| Comp. Ex. 1 | 3 | 200 | 12.0 | 2 | 4 | 5 |
| Comp. Ex. 2 | 3 | 130 | 2.3 | 2 | | 5 |
| Comp. Ex. 3 | 2.7 | 250 | 5.9 | 1 | | 4 |
| Comp. Ex. 4 | 2.7 | 190 | 1.9 | 2 | | 4 |

TABLE 1-continued

| | | | | | | |
|---|---|---|---|---|---|---|
| Comp. Ex. 5 | 0.7 | 200 | 2.2 | 1 | | 3 |
| Comp. Ex. 6 | 1 | 1580 | 1.2 | 1 | 40 (500 times) | 4 |
| Comp. Ex. 7 | −3 | 150 | 3.8 | 3 | 0 | 4 |
| Comp. Ex. 8 | −3 | 530 | 0.8 | 2 | | 3 |
| Comp. Ex. 9 | −3 | 680 | 0.9 | 2 | 1 | 1 |
| Ref. Ex. | 1.3 | — | — | 3 | | — |

Example 4

Four-odor-sealing bags were prepared in the same manner as in Example 1, except that formulations of the antiblocking agent and the antistatic agent were changed as shown in Table 2. Then, the four-odor-sealing bags were evaluated. The results are set forth all together in Table 2.

TABLE 2

| Sample | Layer constitution | | | | | Thickness (μm) Third layer | Formulation of antiblocking agent (ppm) | | | | Ease of tying | |
|---|---|---|---|---|---|---|---|---|---|---|---|---|
| | First | Second | Third | Fourth | Fifth | | All of the layers | Outer layer | Inner layer | Surface active agent | Leakage from knot (time) | Organoleptic test |
| A | LL | AD | AMNY | AD | PE | 1 | 20 | 2500 | 2500 | no | 11.1 | 1 |
| B | LL | AD | AMNY | AD | PE | 1 | 20 | 2500 | 4000 | no | 14.1 | 1 |
| C | LL | AD | AMNY | AD | PE | 1 | 20 | 2500 | 8200 | no | 3.5 | 1 |
| D | LL | AD | AMNY | AD | PE | 1 | 20 | 2500 | 12000 | no | 3.9 | 2 |
| E | LL | AD | AMNY | AD | PE | 1 | 20 | 2500 | 18000 | no | 3.9 | 2 |
| F | LL | AD | AMNY | AD | PE | 1 | 20 | 6000 | 18000 | no | 2.7 | 2 |
| G | LL | AD | AMNY | AD | PE | 1 | 20 | 6000 | 2500 | no | 9.8 | 2 |
| H | LL | AD | AMNY | AD | PE | 1 | 20 | 12000 | 2500 | no | 15.2 | 2 |
| I | LL | AD | AMNY | AD | PE | 1 | 20 | 12000 | 4000 | no | 24.4 | 2 |
| J | LL | AD | AMNY | AD | PE | 1 | 20 | 12000 | 18000 | no | 9.2 | 3 |
| K | LL | AD | AMNY | AD | PE | 1 | 20 | 20000 | 18000 | no | 8.6 | 3 |
| L | LL | AD | AMNY | AD | PE | 1 | 20 | 20000 | 2500 | no | 14.7 | 2 |
| M | LL | AD | AMNY | AD | PE | 1 | 20 | 28000 | 2500 | no | 12.3 | 2 |
| N | LL | AD | AMNY | AD | PE | 1 | 20 | 28000 | 4000 | no | 14.0 | 2 |
| O | LL | AD | AMNY | AD | PE | 1 | 20 | 28000 | 8200 | no | 12.7 | 2 |
| P | LL | AD | AMNY | AD | PE | 1 | 20 | 28000 | 12000 | no | 14.4 | 3 |
| Q | LL | AD | AMNY | AD | PE | 1 | 20 | 28000 | 18000 | no | 9.3 | 3 |
| R | LL | AD | AMNY | AD | PE | 1 | 20 | 2500 | 18000 | yes | 15.2 | 2 |
| S | LL | AD | AMNY | AD | PE | 1 | 20 | 28000 | 2500 | yes | 23.1 | 2 |
| Ex. 1 | LL | AD | AMNY | AD | PE | 1 | 20 | 28000 | 18000 | yes | 34.0 | Reference |

If the antistatic agent is not added and if the amount of the antiblocking agent added to the inner layer is not less than 8,200 ppm, a bag desirable from the viewpoint of evaluation of leakage from the knot cannot be obtained. If the amount of the antiblocking agent in the inner layer is reduced to not more than 4,000 ppm, the leakage from the knot is improved, but the result of the organoleptic test was bad and the bag becomes difficult to tie.

Thus, in the inner layer, the amount of the antiblocking agent added is preferably increased from the viewpoint of ease of tying, but from the viewpoint of odor leakage, the amount thereof cannot be increased.

When the antistatic agent of surface active agent type is added to the outer and the inner layers as in the present invention, high evaluation can be attained with regard to leakage from the knot and difficulty in loosening of the knot even if the amount of the antiblocking agent added to the inner layer is increased up to 18,000 ppm.

The invention claimed is:

1. A foul-odor-sealing bag comprising
  an inner layer and an outer layer each of which comprises polyethylene or an ethylene-based copolymer (referred to as an "ethylene (co)polymer" hereinafter), and
  an intermediate layer comprising a barrier resin, wherein the inner and the outer layers each contain an antiblocking agent and a surface active agent, the amount of the antiblocking agent contained in each of the inner layer and the outer layer is not less than 6500 ppm, the amount of the surface active agent contained in each of them is in the range of 1000 to 8000 ppm,
  the thickness of the intermediate layer is in the range of 0.8 to 5.0 μm, the total thickness of all of the layers is in the range of 10 to 30 μm, the foul-odor-sealing bag is a co-extrusion inflation product and has the bottom sealed by fusion bonding, and
  in the use of the foul-odor-sealing bag, a non-fusion bonded opening is tied closed to seal in the contents.

2. The foul-odor-sealing bag as claimed in claim 1, wherein the antiblocking agent is at least one kind selected from zeolite, talc, kaolin, silica, calcium carbonate and glass powder.

3. The foul-odor-sealing bag as claimed in claim 1, wherein the intermediate layer is joined to the inner layer and/or the outer layer through an adhesive resin layer.

4. The foul-odor-sealing bag as claimed in claim 1, wherein the surface active agent is at least one kind selected from alkylsulfonate, alkylbenzenesulfonate, alkyl phosphate, tetraalkylammonium salt, trialkylbenzylammonium salt, glycerol fatty acid ester, polyoxyalkylene alkyl ether, polyoxyethylene alkylphenyl ether, N,N-bis(2-hydroxyethyl)alkylamine [alias: alkyldiethanolamine], N-2-hydroxyethyl-N-2-hydroxyalkylamine [alias: hydroxyalkylmonoethanolamine], polyoxyethylene alkylamine, polyoxyethylene alkylamine fatty acid ester, alkyl diethanolamide, alkyl betaine and alkyl imidazolium betaine.

5. The foul-odor-sealing bag as claimed in claim 1, wherein the surface active agent functions as an antistatic agent.

6. The foul-odor-sealing bag as claimed in claim 1, wherein the ethylene (co)polymer is linear low-density polyethylene (LLDPE).

7. The foul-odor-sealing bag as claimed in claim 6, wherein the barrier resin comprises at least one kind selected from a polyamide, an ethylene/vinyl alcohol copolymer (EVOH) and polybutylene terephthalate.

8. The foul-odor-sealing bag as claimed in claim 1, wherein the barrier resin comprises at least one kind selected from a polyamide, an ethylene/vinyl alcohol copolymer (EVOH) and polybutylene terephthalate.

9. The foul-odor-sealing bag as claimed in claim 8, wherein the barrier resin is a polyamide containing an amorphous polyamide in an amount of not less than 70% by weight.

10. The foul-odor-sealing bag as claimed in claim 9, wherein an aliphatic polyamide or a polyolefin is contained in the intermediate layer.

11. A disposal method for a household foul-smelling substance, comprising placing a foul-smelling substance in a foul-odor-sealing bag which comprises
an inner layer and an outer layer each of which comprises polyethylene or an ethylene-based copolymer (referred to as an "ethylene (co)polymer" hereinafter), and
an intermediate layer comprising a barrier resin, wherein
the inner and the outer layers each contain an antiblocking agent and a surface active agent,
the amount of the antiblocking agent contained in each of the inner layer and the outer layer is not less than 6500 ppm, the amount of the surface active agent contained in each of them is in the range of 1000 to 8000 ppm,
the thickness of the intermediate layer is in the range of 0.8 to 5.0 μm, the total thickness of all of the layers is in the range of 10 to 30 μm, the foul-odor-sealing bag is a co-extrusion inflation product and has the bottom sealed by fusion bonding; and
tying a non-fusion bonded opening of the sealing bag closed to seal in the contents.

12. The disposal method of claim 11, wherein the surface active agent functions as an antistatic agent.

* * * * *